US008920553B2

(12) United States Patent
Rogers et al.

(10) Patent No.: US 8,920,553 B2
(45) Date of Patent: Dec. 30, 2014

(54) CELLULOSE ETHER COATING COMPOSITIONS AND METHOD

(75) Inventors: True L. Rogers, Bomlitz-Benefeld (DE); Debora L. Holbrook, Pinconning, MI (US); Karen A. Coppens, Midland, MI (US); Robert L. Schmitt, Annandale, NJ (US)

(73) Assignee: Dow Global Technologies LLC, Midland, MI (US)

( * ) Notice: Subject to any disclaimer, the term of this patent is extended or adjusted under 35 U.S.C. 154(b) by 665 days.

(21) Appl. No.: 12/741,769

(22) PCT Filed: Nov. 5, 2008

(86) PCT No.: PCT/US2008/082485
§ 371 (c)(1),
(2), (4) Date: Jul. 8, 2010

(87) PCT Pub. No.: WO2009/061821
PCT Pub. Date: May 14, 2009

(65) Prior Publication Data
US 2010/0275814 A1    Nov. 4, 2010

Related U.S. Application Data

(60) Provisional application No. 60/986,731, filed on Nov. 9, 2007.

(51) Int. Cl.
*C09D 101/28* (2006.01)
*C08L 1/26* (2006.01)
*C08L 1/28* (2006.01)
*C09D 101/26* (2006.01)

(52) U.S. Cl.
CPC . *C08L 1/26* (2013.01); *C08L 1/284* (2013.01); *C09D 101/26* (2013.01); *C09D 101/284* (2013.01)
USPC ................ 106/172.1; 106/184.1; 106/194.2

(58) Field of Classification Search
None
See application file for complete search history.

(56) References Cited

U.S. PATENT DOCUMENTS

| 3,391,135 | A | | 7/1968 | Ouno |
|---|---|---|---|---|
| 3,981,984 | A | | 9/1976 | Signorino |
| 4,543,370 | A | | 9/1985 | Porter et al. |
| 4,678,516 | A | | 7/1987 | Alderman et al. |
| 5,009,895 | A | | 4/1991 | Lui |
| 5,476,668 | A | | 12/1995 | Kobayashi et al. |
| 5,681,382 | A | * | 10/1997 | Kokubo .................. 106/184.1 |
| 6,171,616 | B1 | | 1/2001 | Tanno et al. |
| 6,261,218 | B1 | | 7/2001 | Schulz |
| 6,294,008 | B1 | | 9/2001 | Keary et al. |
| 6,306,333 | B1 | | 10/2001 | Rosenberg et al. |

(Continued)

FOREIGN PATENT DOCUMENTS

| FR | WO02/03967 | * | 1/2002 |
|---|---|---|---|
| GB | 1444890 | | 8/1976 |

(Continued)

*Primary Examiner* — Melvin C Mayes
*Assistant Examiner* — Colette Nguyen

(57) ABSTRACT

The present disclosure is directed to cellulose ether compositions for film-forming coating applications. A coating composition is provided which contains an aqueous solution of either a very low viscosity cellulose ether or a low-hydroxypropyl cellulose ether, the coating composition having low color. The low viscosity of the cellulose ether component enables the coating composition to contain a high concentration of cellulose ether. Provision of these high concentration cellulose ether coating solutions improves production efficiency by reducing the time required to coat a substrate.

18 Claims, 2 Drawing Sheets

(56) References Cited

U.S. PATENT DOCUMENTS

| | | |
|---|---|---|
| 6,410,050 B1 | 6/2002 | Yang |
| 6,517,865 B2 | 2/2003 | Cade et al. |
| 2002/0136843 A1* | 9/2002 | Chopra et al. ............... 427/487 |
| 2007/0179292 A1 | 8/2007 | Spencer |

FOREIGN PATENT DOCUMENTS

| | | |
|---|---|---|
| WO | 0203967 A1 | 1/2002 |
| WO | 03011257 A1 | 2/2003 |
| WO | 2009061815 A1 | 5/2009 |

* cited by examiner

CELLULOSE ETHER COATING COMPOSITIONS AND METHOD

CROSS REFERENCE TO RELATED APPLICATIONS

This application is a 35 USC §371 national phase filing of PCT/US2008/082485 filed Nov. 5, 2008, which claims the benefit of U.S. Provisional Application No. 60/986731, filed Nov. 9, 2007.

BACKGROUND

The present disclosure relates to cellulose ether coating compositions, and coated compositions produced therewith.

Cellulose ethers are commonly used as a film coating material on tablets, as a food additive, and in pharmaceutical capsules. Low molecular weight cellulose ethers oftentimes exhibit yellowing or discoloration. It is known that as the molecular weight of the cellulose ether decreases, the degree of discoloration increases. Using cellulose ethers of higher molecular weight improves the color, however, higher molecular weight cellulose ethers are difficult to use in spray coating operations.

It would be desirable to develop low molecular weight cellulose ether coating compositions that are readily applied to a substrate and provide a coating acceptable for appearance-sensitive applications.

SUMMARY

The present disclosure is directed to cellulose ether compositions for coated applications and coated products made using these compositions. The present disclosure is also directed to methods for producing coated compositions. In an embodiment, a composition is provided. The composition may be a coating composition. The composition includes a plasticizer and an aqueous solution of a very low viscosity cellulose ether. The very low viscosity cellulose ether is present in an amount of at least 10% by weight of the composition. The very low viscosity cellulose either has a viscosity from 1.2 cP to less than 2 cP when measured as a 2% by weight aqueous solution concentration at 20° C. In an embodiment, the very low viscosity cellulose ether may also have low color and have an APHA value from 1 to 100. In a further embodiment, the very low viscosity cellulose ether is also a very low color cellulose ether having an APHA value from 1 to 20.

In an embodiment, the composition may include one or more additional components from the following: a solids-loading enhancer, a second cellulose ether, a surfactant, a lubricant, a polishing agent, a pigment, an anti-tack agent, a glidant, an opacifier, and combinations thereof.

The coating composition has a total solids content from at least 10% by weight to about 40% by weight. The viscosity of the composition is 100 cP to 1000 cP, or from 100 cP to 500 cP (Brookfield viscosity).

The composition may be used to make a coated composition. In an embodiment, a coated composition is provided. The coated composition includes a substrate and a coating on the substrate. The coating contains the plasticizer and the very low viscosity cellulose ether. The very low viscosity cellulose ether is present in the coating in an amount of at least 10% by weight of the coating.

The coating may contain one or more of the following additional components: a surfactant, a coloring agent, a second cellulose ether, a solids-loading enhancer, a lubricant, a polishing agent, a pigment, an anti-tack agent, a glidant, an opacifier, and any combination of these additional components.

The present disclosure provides another composition. This composition may be a coating composition. In an embodiment, this composition includes an aqueous solution of a low-hydroxypropyl cellulose ether. The low-hydroxypropyl cellulose ether is present in the composition in an amount of at least 10% by weight of the composition. The low-hydroxypropyl cellulose ether has a viscosity less than 3 cP when measured as a 2% by weight aqueous solution at 20° C. In an embodiment, the low-hydroxypropyl cellulose ether is a very low color cellulose ether having an APHA value from 1 to 20, The composition may also include a coloring agent and/or a plasticizer.

In an embodiment, the composition may include one or more of the following additional components: a solids-loading enhancer, a second cellulose ether, a surfactant, a lubricant, a polishing agent, a pigment, an anti-tack agent, a glidant, an opacifier and any combination of these additional components. The composition has a total solids content from 10% by weight to about 40% by weight.

The composition may be used to produce a coated composition. In an embodiment, another coated composition is provided. The coated composition includes a substrate and a coating on the substrate. The coating contains at least 10% by weight of the low-hydroxypropyl cellulose ether. In an embodiment, the coating is a single layer film of the low-hydroxypropyl cellulose ether.

The substrate may include one or more surfaces and one or more edges. In an embodiment, the coating covers a surface and an edge of the substrate. In a further embodiment, the coating is a uniform coating. Thus, the coating may have a constant thickness along and on the surface as well as around and on the edge.

In an embodiment, the coating may include one or more of the following additional components: a plasticizer, a solids-loading enhancer, a second cellulose ether, a surfactant, a lubricant, a polishing agent, a pigment, an anti-tack agent, a glidant, an opacifier, and any combination thereof.

In an embodiment, a method for preventing edging is provided. The method includes spraying an aqueous solution on a substrate. The aqueous solution may contain at least 10% by weight of a low-hydroxypropyl cellulose ether. The substrate has a surface and an edge. The method includes forming a coating on the surface and the edge. In an embodiment, the aqueous solution contains a plasticizer. The coating may be a film of the plasticizer and the low-hydroxypropyl cellulose ether. In an embodiment, the method includes forming a uniform coating on the surface and the edge.

An advantage of the present disclosure is the provision of an improved composition for coating substrates.

An advantage of the present disclosure is the provision of an improved coated composition.

An advantage of the present disclosure is the provision of coating compositions with high concentrations of cellulose ether, the compositions having a color acceptable for appearance-sensitive applications.

An advantage of the present disclosure is the provision of cellulose ether-based coating compositions with high concentrations of total solids.

An advantage of the present disclosure is a reduction in the time required to coat a substrate with a cellulose ether.

An advantage of the present disclosure is the reduction in the amount of coating composition required to form a film coating on a substrate.

An advantage of the present disclosure is the reduction and/or elimination of edging during a spray coating operation.

DETAILED DESCRIPTION

Figure 1:
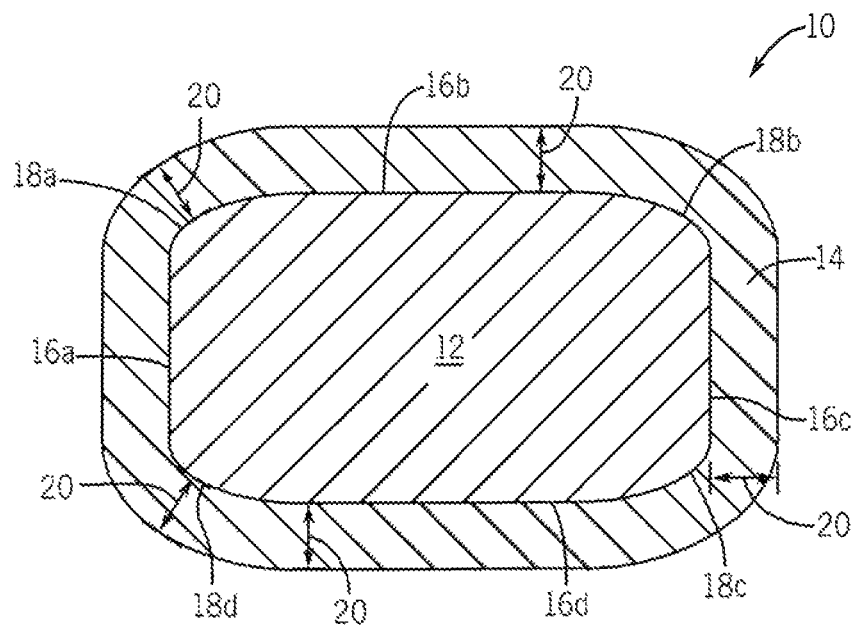
FIG. 1 is a sectional view of a coated composition in accordance with the present disclosure.

Any numerical range recited herein, includes all values from the lower value and the upper value, in increments of one unit, provided that there is a separation of at least two units between any lower value and any higher value. As an example, if it is stated that a compositional, physical or other property, such as, for example, molecular weight, melt index, etc., is from 100 to 1,000, it is intended that all individual values, such as 100, 101, 102, etc., and sub ranges, such as 100 to 144, 155 to 170, 197 to 200, etc., are expressly enumerated in this specification. For ranges containing values which are less than one, or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this application. Numerical ranges have been recited, as discussed herein, in reference to density, weight percent of component, tan delta, molecular weights and other properties.

The term "composition," as used herein, includes a mixture of materials which comprise the composition.

The terms "blend" or "polymer blend," as used herein, mean a composition of two or more polymers. Such a blend may or may not be miscible. Such a blend may or may not be phase separated. Such a blend may or may not contain one or more domain configurations, as determined from transmission electron microscopy.

In an embodiment, a composition is provided. The composition may be a coating composition. The composition includes an aqueous solution of a very low viscosity cellulose ether and a plasticizer. The very low viscosity cellulose ether serves as a film-forming agent and is present in an amount of at least 10% by weight of the composition, or at least 20% by weight, or from 10% to 40% (or any value or subrange therebetween), or from 20% to 30%, or from 20% to 27%, or from 20% to 24% by weight of the composition. As used herein, a "very low viscosity" (VLV) cellulose ether is a cellulose ether having a molecular weight such that a 2% by weight aqueous solution of it at 20° C. has a viscosity of from 1.2 centipoise (cP) to less than 2 cP (or any value or subrange therebetween). Unless stated otherwise, the viscosity values set forth herein are determined according to ASTM D1347 (methyl cellulose) and/or ASTM D2363 (hydroxypropylmethylceluIlose) measured as a 2% by weight cellulose ether aqueous solution at 20° C.

A "cellulose ether," as used herein, is an ether-linked derivative, either partial or complete, of cellulose. Cellulose ether is produced from cellulose pulp, typically obtained from wood or cotton. The cellulose pulp is converted into alkaline cellulose by alkalizing the cellulose pulp with an alkali hydroxide, and then etherifying the alkalized cellulose in a dry, gas-phase or slurry process with one or more etherifying agents The molecular weight of these cellulose ethers can then be reduced by depolymerizing the cellulose ether with an acid, such as hydrogen chloride, and optionally neutralizing the depolymerized cellulose ether with a basic compound, such as anhydrous sodium bicarbonate. Alternatively, the cellulose ether may be depolymerized by way of acid catalyzed degradation, oxidative degradation, degradation by high-energy radiation, and degradation by way of microorganisms or enzymes.

The cellulose ether may be a "water soluble" cellulose ether or a "water insoluble" cellulose ether. A "water-soluble" cellulose ether is a cellulose ether that prior to the partial depolymerization has a solubility in water of at least 2 grams in 100 grams of distilled water at 25° C. and 1 atmosphere. Nonlimiting examples of water soluble cellulose ethers include carboxy-$C_1$-$C_3$-alkyl celluloses, such as carboxymethyl celluloses; carboxy-$C_1$-$C_3$-alkyl hydroxy-$C_1$-$C_3$-alkyl celluloses, such as carboxymethyl hydroxyethyl celluloses; $C_1$-$C_3$-alkyl celluloses, such as methylcelluloses; $C_1$-$C_3$alkyl hydroxy-$C_{1-3}$-alkyl celluloses, such as hydroxyethyl methylcelluloses, hydroxypropyl methylcelluloses or ethyl hydroxyethyl celluloses; hydroxy-$C_{1-3}$-alkyl celluloses, such as hydroxyethyl celluloses or hydroxypropyl celluloses; mixed hydroxy-$C_1$-$C_3$-alkyl celluloses, such as hydroxyethyl hydroxypropyl celluloses, mixed $C_1$-$C_3$-alkyl celluloses, such as methyl ethyl celluloses, or alkoxy hydroxyethyl hydroxypropyl celluloses, the alkoxy group being straight-chain or branched and containing 2 to 8 carbon atoms.

The cellulose ether may be a water-insoluble cellulose ether, A "water-insoluble" cellulose ether is a cellulose ether that prior to the partial depolymerization has a solubility in water of less than 2 grams, or less than 1 gram in 100 grams of distilled water at 25° C. and 1 atmosphere. A nonlimiting example of a water-insoluble cellulose ether is ethylcellulose.

In an embodiment, the cellulose ether is methylcellulose, hydroxyethyl cellulose, hydroxypropyl cellulose, hydroxyethylmethyl cellulose, hydroxypropylmethyl cellulose, hydroxybutylmethyl cellulose, ethylhydroxyethyl cellulose, carboxymethyl cellulose, and carboxymethyl hydroxyethylcellulose.

In a further embodiment, the cellulose ether is hydroxypropylmethylcellulose (HPMC) or methylcellulose (MC). HPMC and/or MC are available under the METHOCEL trademark from The Dow Chemical Company, Midland, Mich. Nonlimiting examples of suitable HPMC and MC are set forth in Table 1 below.

TABLE 1

METHOCEL™ Products

| METHOCEL™ Product | Chemical Type | Methoxyl Content, % | Hydroxypropyl Content, % | Viscosity of 2% solution in water, cps |
|---|---|---|---|---|
| METHOCEL™ A15 Premium LV | Methylcellulose, USP | 27.5-31.5 | 0 | 12-18 |
| METHOCEL™ A4C Premium | Methylcellulose, USP | | | 300-560 |
| METHOCEL™ A15C Premium | Methylcellulose, USP | | | 1125-2100 |
| METHOCEL™ A4M Premium | Methylcellulose, USP | | | 3000-5600 |
| METHOCEL™ E3 Premium LV | Hypromellose 2910 | 28-30 | 7-12 | 2.4-3.6 |
| METHOCEL™ E5 Premium LV | Hypromellose 2910 | 28-30 | 7-12 | 4-6 |
| METHOCEL™ E6 Premium LV | Hypromellose 2910 | 28-30 | 7-12 | 5-7 |
| METHOCEL™ E15 Premium LV | Hypromellose 2910 | 28-30 | 7-12 | 12-18 |
| METHOCEL™ E50 Premium LV | Hypromellose 2910 | 28-30 | 7-12 | 40-60 |
| METHOCEL™ E4M Premium | Hypromellose 2910 | 28-30 | 7-12 | 3000-5600 |
| METHOCEL™ E10M Premium CR | Hypromellose 2910 | 28-30 | 7-12 | 7500-14,000 |
| METHOCEL™ F50 Premium | Hypromellose 2906 | 27-30 | 4-7.5 | 40-60 |
| METHOCEL™ F4M Premium | Hypromellose 2906 | 27-30 | 4-7.5 | 3000-5600 |
| METHOCEL™ K3 Premium LV | Hypromellose 2208 | 19-24 | 7-12 | 2.4-3.6 |
| METHOCEL™ K100 Premium LV | Hypromellose 2208 | 19-24 | 7-12 | 80-120 |
| METHOCEL™ K4M Premium | Hypromellose 2208 | 19-24 | 7-12 | 3,000-5,600 |
| METHOCEL™ K15M Premium | Hypromellose 2208 | 19-24 | 7-12 | 11,250-21,000 |
| METHOCEL™ K100M Premium | Hypromellose 2208 | 19-24 | 7-12 | 80,000-120,000 |

The cellulose ether may be a high-hydroxypropyl cellulose ether or a low-hydroxypropyl cellulose ether. As used herein, a "high-hydroxypropyl cellulose ether" is a hydroxypropyl-methylcellulose having 28-30% by weight methoxyl groups and 7.0-12.0% by weight hydroxypropoxyl groups. A nonlimiting example of a high-hydroxypropyl cellulose ether is Hypromellose 2910 available from The Dow Chemical Company, Midland, Mich. under the trademark METHOCEL, E. A "low-hydroxypropyl cellulose ether" is a hydroxypropyl-methylcellulose having 27-30% by weight methoxyl groups and 4.0-7.5% by weight hydroxypropxyl groups. A nonlimiting example of a low-hydroxypropyl cellulose ether is Hypromellose 2906 available from The Dow Chemical Company, Midland, Mich. under the trademark METHOCEL F.

In an embodiment, the VLV cellulose ether has an American Public Health Association (APHA) color value from 1 to 100 (or any value or subrange therein) or from 1 to 50, or from 1 to 30, or from 1 to 20. The APHA value is determined in accordance with ASTM D-5386 (2% concentration in aqueous solution at ambient temperature). In a further embodiment, the VLV cellulose ether is a very low color cellulose ether. As used herein, a "very low color" (VLC) cellulose ether is a cellulose ether having an APHA value from 1 to 20 (or any value or subrange therebetween). VLV cellulose ether and/or VLC cellulose ether may be produced as set forth in U.S. Patent Application Ser. No. 60/986,686 filed on Nov. 9, 2007, the entire content of which is incorporated by reference herein.

In an embodiment, the composition includes a plasticizer. The plasticizer present in the composition improves film performance of the cellulose ether in the aqueous solution. The plasticizer may be a polyethylene glycol, castor oil, dibutyl sebacate, diethyl phthalate, glycerol, polyethylene glycol methyl ether, triacetin, triethyl citrate, a phospholipid, lecithin, propylene glycol, and any combination thereof. In an embodiment, the plasticizer is present in an amount from 1% to 10% by weight (or any value or subrange therebetween), or from 1% to 5% by weight, or from 2% to 4% by weight of the composition. In a further embodiment, the plasticizer is a polyethylene glycol having a molecular weight from about 100 to about 1000 (or any value or subrange therebetween), or a molecular weight of about 400.

In an embodiment, the composition includes a surfactant. The surfactant lowers the surface tension of the aqueous solution to promote dispersion of the VLV cellulose ether and/or the surfactant facilitates the spreading of the coating composition on the substrate. The surfactant may be a polyoxylated sorbitol and fatty acid (i.e., sorbitan monolaurate, sorbitan monopalmitate, sorbitan monostearate, car sorbitan monooleate or polysorbate), sodium lauryl sulfate, docusate sodium, glyceryl monostearate, poloxamer, polyoxyethylene alkyl ether, polysorbate, sorbitan fatty acid ester, lecithin, and phospholipid. The surfactant is present in an amount from about 0.001 to 0.5% by weight (or any subrange or value therebetween), or from 0.001-0.1% by weight, or from 0.001 to 0.07% by weight of the composition.

In an embodiment, the composition includes a coloring agent. The coloring agent may be any FD & C lake, D & C lake, dye (water soluble or water insoluble) approved for ingestion by the U.S. Federal Drug Administration or similar governmental regulatory body. In an embodiment, the coloring agent is an aluminum-based lake. The coloring agent is present in an amount from 0.05% to 7% by weight (or any value or subrange therebetween), or from 0.1% to 1.5% by weight, or from 0.45% to 0.75% by weight of the composition. The composition may include a pigment. The pigment may be present in an amount from 0.5% to 7% by weight (or any value or subrange therebetween, or from 0.1% to 1.5% by weight or from 0.4% to 0.8% by weight of the composition.

In an embodiment, the composition includes a second cellulose ether. The second cellulose ether serves as a supplemental film forming agent. The second cellulose ether may be a high viscosity cellulose ether, a low viscosity cellulose ether, or a combination thereof. A "high viscosity" cellulose ether is a cellulose ether having a molecular weight such that a 2% by weight aqueous solution of it at 20° C. has a viscosity greater than 400cP, or from 400 cP to 100,000 cP. Alternatively, the second cellulose ether may be a low viscosity cellulose ether. A "low viscosity" cellulose ether is a cellulose ether having a molecular weight such that a 2% by weight aqueous solution of it at 20° C. has a viscosity of 2 centipoise (cP) to 400 cP. In a further embodiment, the second cellulose ether is a low viscosity HPMC present in an amount from 0.01% to 1.5% by weight (or any value or subrange therebetween), or about 1% by weight of the composition. It has unexpectedly and surprisingly been found that provision of the second cellulose ether advantageously prevents edging when the composition is sprayed onto a substrate.

In an embodiment, the composition may include one or more of the following components: a solids-loading enhancer, a second surfactant, a lubricant/polishing agent, a pigment, an anti-tack agent, a glidant, an opacifier, and any combination thereof. Nonlimiting examples of suitable solids-loading enhancers include high molecular weight water soluble polyethylene oxide) polymers (POLYOX™), acacia, and sugars (such as lactose). The lubricant/polishing agent may be a wax such as carnauba wax or beeswax. The pigment may be titanium dioxide. The anti-tack agent and/or the glidant may be talc, collidal silicon dioxide, glyceryl monostearate, and combinations thereof, The opacifier may be calcium carbonate.

The composition may have a total solids content from at least 10% to about 40% by weight (or any value or subrange therebetween), or from 20% to 40%, or from 23% to 35% by weight, or front 24% to 29% by weight of the composition. The viscosity of the composition may be from 100 cP to 1000 cP (or any value or subrange therebetween), or from 100 cP to 500 cP (Brookfield viscosity).

The composition may be applied to a substrate to form a coated composition. Coating devices such as a fluidized bed coating device, a pan coating device, and/or a flow-through rotational drum type coating device may be used to apply, spray, or atomize the composition onto the exterior of a substrate. Thus, the present disclosure provides a coated composition. In an embodiment, the coated composition includes a substrate and a coating on the substrate. The coating contains the VLV cellulose ether and the plasticizer. The VLV cellulose ether is present an amount of at least 10%, or greater than 20%, or at least 10% to 40% by weight of the coating. In an embodiment, the coating includes a surfactant and a coloring agent.

As used herein, a "substrate" is an object capable of being partially or fully covered with cellulose ether. Nonlimiting examples of suitable substrates include tablets for oral ingestion, food products, pharmaceutical products (pharmaceutical tablets and capsules), medicaments, drugs, seeds, animal feed, granules, beads, powder, troches and fertilizer. The substrate may also be an encapsulate such as a particulate material, the particulate material being encapsulated (micro- or macro-encapsulation) by the coating.

The coating may be located on a portion of the substrate. In another embodiment, the coating surrounds the entire substrate and encapsulates the substrate. Consequently, the VLV cellulose ether forms a film on (i) a portion of the substrate or (ii) around the entire substrate. In an embodiment, the dried coating may be 1% to 20% by weight (or any value or subrange therebetween) of the substrate.

In an embodiment, the coating includes a second cellulose ether. The second cellulose ether may be any cellulose ether as previously described herein. In a further embodiment, the coating contains one or more of the following components: a solids-loading enhancer, a second surfactant, a lubricant/polishing agent, a pigment, an anti-tack agent, a glidant, an opacifier, and any combination thereof. The presence of each of these components in the coating may correspond to the amount of each compound that is present in the foregoing coating composition.

The composition may comprise two or more embodiments disclosed herein.

The present disclosure provides another composition. This composition may be a coating composition. In an embodiment, the composition includes an aqueous solution of a low-hydroxypropyl cellulose ether. The solution contains at least 10% by weight, or greater than 20% by weight, or from 10% to 30% by weight (or any value or subrange therebetween), or from 14% to 23% by weight, or from 16% to 21% by weight of the low-hydroxypropyl cellulose ether. The low-hydroxypropyl cellulose ether serves as a film-forming agent. In an embodiment, the composition may include a plasticizer and/or may include a coloring agent.

In an embodiment, the low-hydroxypropyl cellulose ether has a viscosity less than 3 cP when measured as a 2% by weight aqueous solution at 20° C. For example, the low-hydroxypropyl cellulose ether has a viscosity from 1.2 cP to 3 cP (or any value or subrange therebetween), or from 2.61 cP to 2.66 cP. In a further embodiment, the low-hydroxypropyl cellulose ether is a VLC cellulose ether having an API-IA value from 1-20 (or any value or subrange therebetween), or from 15 to 16.5. The low-hydroxypropyl cellulose ether with a viscosity less than 3 cP (and very low color) may be produced as set forth in U.S. Patent Application Ser. No. 60/986, 686 filed on Nov. 9, 2007, the entire content of which is incorporated by reference herein.

The plasticizer may be any plasticizer as previously disclosed herein. The plasticizer may be present in an amount from 1% to 10% by weight (or any value or subrange therebetween), 1% to 3.3% by weight, or 1.6% to 2.2% by weight of the composition. In an embodiment, the plasticizer is a polyethylene glycol.

The coloring agent may be any coloring agent as previously disclosed herein. The coloring agent may be present in an amount from 0.5% to 7% by weight (or any value or subrange therebetween, or from 0.1% to 1.5% by weight or from 0.4% to 0.8% by weight of the composition. In an embodiment, the coloring agent may be an aluminum lake pigment and/or a water soluble dye. The composition may include a pigment. The pigment may be present in an amount from 0.5% to 7% by weight (or any value or subrange therebetween, or from 0.1% to 1.5% by weight or from 0.4% to 0.8% by weight of the composition.

In an embodiment, the composition may include one or more of the following components: a surfactant, second cellulose ether, a solids-loading enhancer, a lubricant/polishing agent, an anti-tack agent, a glidant, an opacifier and combinations thereof. The composition has a total solids content from 10% by weight to about 40% by weight (or any value or subrange therebetween), or from 15% to 28% by weight, or from 18% to 25% by weight of the composition.

This composition may be applied to a substrate to form a coated composition as previously disclosed herein. Thus, the present disclosure provides another coated composition. In an embodiment, a coated composition 10 includes a substrate 12 and a coating 14 on the substrate as shown in FIG. 1. The coating 14 contains at least 10% by weight, or greater than 20% by weight, or from 10% to 40% by weight (or any value or subrange therebetween), or from 14% to 23% by weight, or from 16% to 21% by weight of the low-hydroxypropyl cellulose ether. The low-hydroxypropyl cellulose ether present in the coating 14 may have a viscosity less than 3 cP and/or may be a VLC cellulose ether as discussed above.

The coating may be located on a portion of the substrate. Alternatively, the coating 14 surrounds the entire substrate 12 and encapsulates the substrate as shown in FIG. 1. Consequently, the low-hydroxypropyl cellulose ether forms a film on (i) a portion of the substrate or (ii) around the entire substrate.

In an embodiment, the coating may include one or more of the following components: a plasticizer, a coloring agent, a second cellulose ether, a surfactant, a solids-loading enhancer, a pigment, a lubricant/polishing agent, an anti-tack agent, a glidant, an opacifier and combinations thereof. The amount for each of these components may be the same as (or greater than) the respective amount for each component in the composition as discussed above.

In an embodiment, the substrate 12 has one or more surfaces 16a, 16b, 16c, 16d and one or more edges 18a, 18b, 18c, and 18d. The coating 14 covers at least one surface and at least one edge. In a further embodiment, the coating 14 covers all the surfaces 16a-16d and all the edges 18a-18d as shown in FIG. 1.

Figure 2:
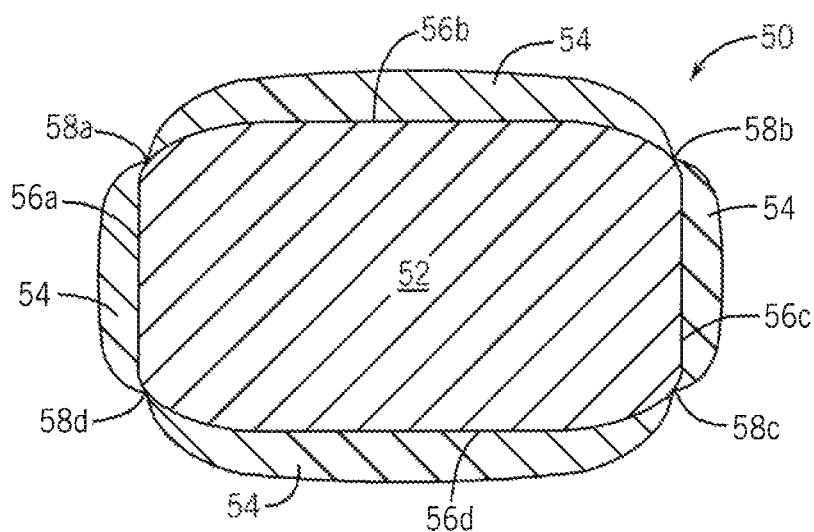
FIG. 2 is a sectional view of a coating composition exhibiting edging.

In an embodiment, the coating containing the low-hydroxypropyl cellulose ether may be used to prevent edging. As used herein, "edging" is the phenomenon whereby the edges of a substrate are uncoated and the surfaces are coated during a spray coating process. Edging is typically observed during the spray coating of tablets, for example. FIG. 2 shows a coated composition 50 exhibiting edging. The coating 54 covers surfaces 56a, 56b, 56c, and 56d of the substrate 52. However, one or more edges 58a, 58b, 58c, and 58d are not covered by the coating 54 to the same extent as surfaces 56 a-d are covered.

Not wishing to be bound by any particular theory, it is believed that the high concentration of the low-hydroxypropyl cellulose ether in the coating composition and the low amount of hydroxypropyl groups present in low-hydroxypropyl cellulose ether contribute to promote coating adherence to the substrate and film formation around the substrate edges during spray application. It has surprisingly and unexpectedly been found that coating solutions containing high concentrations (i.e., at least 10% by weight) of the low-hydroxypropyl cellulose ether reduce, even eliminate, edging during a spray coating process. Consequently, in an embodiment, the low-hydroxypropyl cellulose ether solution permits coverage of the entire substrate 12 with a single layer of the coating 14 (FIG. 1).

In an embodiment, the coating 14 is a uniform coating along the surfaces and the edges of the substrate 12. As used herein, "uniform" is a constant thickness along the extent of the coating. FIG. 1 shows a thickness 20 for the coating 14. The thickness 20 is the same or constant at all points around the circumference of the coated composition 10. In other words, the thickness 20 of the coating 14 is the same, or substantially the same, at the edges 18a-18d as it is along the surfaces 16a-16d.

The coated composition may comprise two or more embodiments disclosed herein.

In an embodiment, a method for preventing edging is provided. The method includes spraying an aqueous solution containing a low-hydroxypropyl cellulose ether onto a substrate. The solution contains at least 10% by weight or greater than 20% by weight, or from 10% to 40% by weight (or any value or subrange therebetween), or from 14% to 23% by weight, or from 16% to 21% by weight of the low-hydroxypropyl cellulose ether. The substrate has a surface and an edge. The method includes forming a coating of the low-hydroxypropl cellulose ether on the surface and on the edge. In an embodiment, the solution may include a plasticizer. In a further embodiment, the method includes forming a uniform coating on the surface and on the edge.

Provision of the VLV cellulose ether and/or the low-hydroxypropyl cellulose ether in the present coating compositions carry several advantages. The ability to spray the VLV cellulose ether/low-hydroxypropyl cellulose ether at high concentration in aqueous environments render the coating compositions very useful as a taste masking agent and as a flavor fixative in oral solid dosage forms, liquid suspensions, feed, veterinary applications and nutritional supplements. This also improves the visual attractiveness of the resultant coated composition by providing a smooth (non-stippled) surface, and uniform coating without edging. The VLV cellulose ether and/or the low-hydroxypropyl cellulose ether are also very useful for encapsulation techniques for producing oral solid dosage forms, veterinary and agricultural applications, food, feed, nutritional supplements and cosmetics.

The present disclosure provides coating compositions with significantly higher dissolved cellulose ether than conventional cellulose ether coating compositions. High concentrations of dissolved VLV cellulose ether and/or low-hydroxypropyl cellulose ether do not impair the ability of the film-coating formulations containing these compositions to be atomized or uniformly coat a substrate. Because significantly higher film-forming polymer concentrations can be dissolved, coating times can be significantly reduced beyond what is currently attainable, in addition, the present film-forming agents—such as the VLV cellulose ether and the low-hydroxypropyl cellulose ether, for example—also exhibit VLC properties. This is particularly surprising for the low-hydroxypropyl cellulose ether. Conventional low-hydroxypropyl cellulose ether grades typically form significantly dark aqueous solutions. Conversely, the applicants have surprisingly discovered a method by which to apply film-coatings using highly concentrated film-coating solutions which contain low-hydroxypropyl cellulose ether while avoiding the unacceptable formation of dark-color which occurs with conventional low-hydroxy-propyl cellulose ether film-coating solutions, Accordingly, significant time savings can be reaped while simultaneously producing high quality film-coated substrates with use of the compositions disclosed herein.

Concentrations of dissolved film-forming polymer, namely the VLV cellulose ether and the low-hydroxypropyl cellulose ether, are significantly higher than attainable with current conventional cellulose ether grades (without adversely affecting atomization, coat uniformity or solution color). The total solids content in the coating compositions disclosed herein may be in excess of 10% by weight depending upon the levels and types of additional excipients used (pigments, plasticizers, surfactants, etc.). This is advantageous as the present coating compositions provide high total solids-loading, yet the present coating compositions have a viscosity amenable to atomization and uniform film-coating application. Because significantly higher film-forming polymer concentrations can be achieved, coating times can be significantly reduced beyond what is currently attainable. In addition, production of dull film-coatings is avoided because the VLV cellulose ether and the low-hydroxypropyl cellulose ether each exhibit VLC properties. The VLV cellulose ether and the low-hydroxypropyl cellulose ether are produced in such a way that the production of colorimetric by-products is avoided. Consequently, colorimetric by-products, which impart dark solution color commonly found in conventional cellulose ether film-coating solutions are advantageously absent in the present VLV cellulose ether and low-hydroxypropyl cellulose ether.

By way of example and not limitation, examples of the present disclosure will now be given.

EXAMPLES

Example 1

| VLV cellulose ether coating composition | | |
| --- | --- | --- |
| Component | 2% Viscosity, cP (ASTM D2363) | Amount (% wt) |
| Component A may be one or more of the following cellulose ether products: | | 20-30 |
| E1.8VLV | 1.8 | |
| E1.9VLV | 1.9 | |
| E2.1VLV | 2.1 | |
| E2.2VLV | 2.2 | |
| Component B: polyethylene glycol (MW = 400, CARBOWAX ™ SENTRY ™ 400, CAS No. 25322-68-3, The Dow Chemical Company). | | 1-10 |
| Component C: sodium lauryl sulfate (MW = 288.38, CAS No. 151-21-3, Sigma-Aldrich). | | 0.001-0.5 |
| Component D: aluminum lake pigment (FD&C Yellow No. 5 HT Al Lake, product no. 5175, Colorcon, Inc.). | | 0.05-7 |
| Component E: water. | | qs |
| Optional Additional Components | | |
| Component F: METHOCEL E6PLV film. | 6 | |
| Component G: SENTRY ™ POLYOX ™ WSR N-10 (CAS No. 25322-68-3, The Dow Chemical Company). | | |
| Component H: lactose (CAS No 5989-81-1). | | |
| Component I: *acacia* (CAS No. 9000-01-5). | | |
| Component J: polysorbate 80 (CAS No. 9005-65-6). | | |
| Component K: lubricating agent, carnauba wax (CAS No. 8015-86-9) or beeswax (CAS No. 8012-89-3). | | |
| Component L: pigment, titanium dioxde (CAS No. 13463-67-7) | | |
| Component M: polishing agent, carnauba wax (CAS No. 8015-86-9) or beeswax (CAS No. 8012-89-3). | | |
| Component N: anti-tack agent glidant talc (CAS No. 14807-96-6), colloidal silicon dioxide (CAS No. 7631-86-9), glyceryl monostearate (CAS No. 31566-31-1) | | |
| Component O: opacifier, calcium carbonate (CAS No. 471-34-1) | | |

To make the cellulose ether stock solutions, water is brought to a boil in a Sunbeam kettle (model no. K47AMD YE) containing an internal heating coil. After bringing the water to a rolling boil, the power supply to the kettle is removed, and the water is then weighed into a beaker. The water is stirred using a StedFast™ Stirrer (model no. SL 600, Fisher Scientific) equipped with a marine propeller-type stirring shaft. Cellulose ether is slowly added to the stirring hot water until all cellulose ether is thoroughly dispersed. The dispersion is then allowed to equilibrate to room temperature under constant stirring. Upon reaching room temperature, cellulose ether is fully dissolved into solution. Any water that has evaporated is replaced with fresh water. Each stock solution is then transferred to a jar, capped, and placed on a roller apparatus overnight for solution equilibration. Stock solutions are stored at 15° C. until used. Prior to use, stock solutions are equilibrated to room temperature. Stock solution cellulose ether concentrations of 15% (E6PLV) and 35% (w/w) (E2.1VLV) are used to make the film-coating composition.

CARBOWAX™ SENTRY™ 400 is used as received.

To make the sodium lauryl sulfate (SLS) stock solution, water is weighed into a beaker and stirred using a StedFast™. Stirrer equipped with a marine propeller-type stirring shaft. SLS is dissolved in the water to make a 0.5% (w/w) stock solution. The stock solution is stored at room temperature.

To make the aluminum lake stock dispersions, water is weighed into a beaker of volume capacity at least twice that occupied by the final aluminum lake stock dispersion. This is done to allow room for vigorous mixing during homogenization. The aluminum lake is weighed and added to the water at a 5% (w/w) concentration. The dispersion is then homogenized with a rotor-stator homogenizer (Polyscience, model no. X-52.0) using the procedure listed in the table below.

The procedure is repeated 2-3 times to ensure sufficient dispersion and particle size reduction of Aluminum lake.

| Step | Duration (seconds) |
| --- | --- |
| Homogenize at 11,000 rpm | 15 |
| Homogenize at 15,000 rpm | 15 |
| Homogenize at 19,000 rpm | 15 |
| Homogenize at 22,000 rpm | 15 |
| Homogenize at 26,000 rpm | 15 |
| Cap jar and shake by hand | 60 |

*rpm = revolutions per minute

The stock solutions, CARBOWAX™ SENTRY™ 400 and aluminum lake stock dispersion are blended together to achieve the desired concentration of each ingredient in the resulting film-coating formulation. The components are blended together using a StedFast™ Stirrer equipped with a marine propeller-type stirring shaft. The film-coating formulation is stirred continuously for at least 1 hour to ensure a homogeneous mixture.

The viscosity of the film-coating formulation is measured using a Brookfield Digital Viscometer (model no. DV 11, Brookfield Engineering Laboratories, Inc.) equipped with an spindle set. Spindles 1 through 7 are used as necessary depending on the viscosity of the film-coating formulation. Spindle 1, the largest spindle, is used for the lowest viscosity samples. Spindle 7, the smallest spindle, is used for the highest viscosity samples. The spindle rotation settings used are dial readings of 0.5, 1, 2.5, 5, 10, 20, 50 and 100, with 0.5 being the slowest rotation speed and 100 the fastest. To prepare the instrument, the largest spindle necessary is estimated (depending upon visual observation of the sample viscosity) and attached to the viscometer. The viscometer is then calibrated for that particular spindle. The digital display is programmed to provide the viscosity data in cP units. The dial is set to 0.5 and the spindle motor is turned on. The dial setting is gradually increased until the "low" indicator light turns off, indicating that the spindle speed is sufficient to obtain a valid viscosity reading. Viscosity is recorded. Spindle setting is increased and viscosity readings are recorded until the digital display reads "BEE". This indicates that the spindle speed has become too fast to obtain a valid viscosity reading. The viscometer motor is turned off prior to removal of the spindle. Each time a different spindle is used, the viscometer was calibrated for that particular spindle and the display programmed to provide the viscosity data in cP units. If possible, one to three spindles are used to test the viscosity of each stock solution or film-coating formulation.

Scored, oval placebo tablets (400 mg per tablet) are compressed using 0.49"×0.27" concaved tooling. The tablet formulation is listed in the table below.

| Scored, Oval Plaebo Tablet Formulation | |
|---|---|
| 69.85% | DCL11 Pharmatose (lactose) |
| 29.65% | Avicel PH 102 (microcrystalline cellulose) |
| 0.50% | Magnesiun stearate |

Tablets are coated with the film-coating compositions using a HI-COATER (model LDCS, Vector Corporation) equipped with a 1.3-L baffled pan. The spray nozzle is cleaned and calibrated using the "F3: Calibrate Guns" menu. The film-coating run parameters are programmed using the "F1: Manual Process" menu.

Prior to film-coating, a 400-600 g batch of tablets is introduced into the pan, and the exhaust blower and process heat are initiated. The pan is then intermittently operated (10 seconds on, 10 seconds off) in order to equilibrate the tablets to the desired operating temperature. Exhaust temperature is used as the operating temperature set point, meaning that the heat is automatically adjusted to maintain the exhaust air at a relatively constant temperature. Once the desired exhaust temperature is attained, the pan is operated in continuous fashion, and the film-coating formulation is atomized via the nozzle onto the tumbling tablet bed. After the desired amount of film-coating formulation is introduced onto the tumbling tablet bed, atomization is stopped, and the film-coated tablets are tumble-dried continuously at the same exhaust temperature for 30 minutes. After drying, the pan, process heat and exhaust blower are stopped in consecutive order.

The tablets are weighed before and after film-coating to determine the percent weight gain. The film-coated tablets are visually inspected for bridging, coating of sharp curvatures, edging, and coat smoothness and homogeneity.

| VLV Cellulose Ether Coating Composition | | |
|---|---|---|
| Ingredient | Solids % (w/w) | Quantity (g) |
| E2.1VLV | 20.0 | 75.03 (35% stock sol.) |
| E6PLV | 1.00 | 8.75 (15% stock sol.) |
| Component B | 3.30 | 4.33 |
| Component C | 0.001 | 0.26 (0.5% stock sol.) |
| FD&C Yellow No. 5 HT Al Lake | 0.50 | 13.17 (5% stock disp.) |
| Water | — | 29.75 |
| Total | 24.8 | 131.3 |

| VLV Cellulose Ether Coating Composition Viscosity (Brookfield Viscosity) | | |
|---|---|---|
| Spindle | Dial Setting | Viscosity (cP) |
| 3 | 50 | 460 |
| 3 | 100 | 440 |

| VLV Cellulose Ether Coating Composition Run Parameters | |
|---|---|
| Pan Size | 1.3 L |
| Pan Speed | 20 rpm |
| Exhaust Temperature Setpoint | 25° C. |
| Inlet Airflow Rate | 45 cfm |
| Peristaltic Pump Rate | 7 rpm |
| Spray Rate | 2.31 g/min |
| Nozzle Atomization Pressure | 25 psi |

| VLV Cellulose Ether Coating Composition Run Results | |
|---|---|
| Coating Time | 24.9 min |
| Tablet Weight Gain | |
| Target | 3% |
| Actual | 3.48% |
| Tablet Batch Weight | |
| Start | 400.39 g |
| Finish | 414.31 g |
| Tablet Appearance | Aesthetically acceptable, Uniform coating. |

Upon visual inspection, the VLV cellulose ether-coated tablets are aesthetically acceptable and are uniformly coated. The tablets are coated to a 3% weight gain target, with an actual weight gain of 3.48%. Inclusion of SLS into the film-coating formulation helps spread the YIN cellulose ether coating composition across the tablet surface. A lower weight gain (3% vs. 4%) produces an equally aesthetic film-coating.

The experiment is repeated, except tablets containing naproxen sodium are film-coated. Dissolution testing is conducted to ensure that the film-coating does not impede the release of naproxen sodium.

Dissolution testing (USP 29 Type 2 (Paddle) Method) is performed using a Distek Dissolution System 2100B (Crescent Scientific Pvt. Ltd. Goregaon-East, Mumbai, India) equipped with a Hewlett-Packard 8452A Diode Array Spectrophotometer (Hewlett-Packard Co. Palo Alto, Calif., USA). Dissolution testing for each sample is conducted in replicates of six (n=6) using 900 mL deaerated, deionized water (deaerated using a Distek MD-1 De-Gasser) per standard vessel. Dissolution media temperature is equilibrated to 37.0±0.5° C. using a Distek TCS0200B heater/circulator, and paddle speed is set at 50 rpm. Small cells (1.0 mm) are used in the spectrophotometer. Dissolved naproxen sodium is quantified at ultraviolet wavelengths between 330 and 334 nm.

Figure 3:
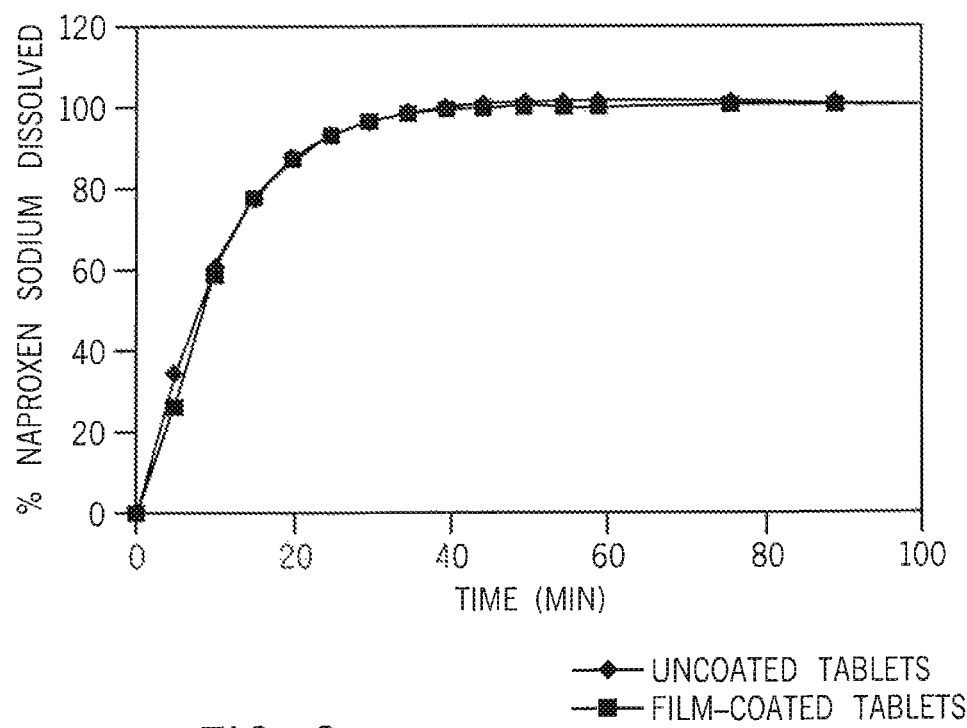
FIG. 3 is a graph comparing dissolution rates for uncoated tablets and coated compositions in accordance with the present disclosure.

FIG. 3 shows that the VLV cellulose ether-coated tablets release naproxen sodium nearly identically to uncoated naproxen sodium tablets.

Example 2

| VLV Cellulose Ether Coating Composition VLV Cellulose Ether Coating Composition | | |
|---|---|---|
| Ingredient | Solids % (w/w) | Target Qty. (g) |
| E1.8 VLV | 20.0 | 571.4 (35% stock sol.) |
| Component F | 1.0 | 50.0 (20% stock sot.) |
| Component B | 3.30 | 33.0 |

| | | |
|---|---|---|
| Component C | 0.001 | 2.0 (0.5% stock sol.) |
| FD&C Yellow No. 5 HT Al Lake | 0.50 | 100.0 (5% stock disp.) |
| Water | — | 243.6 |
| Total | 24.8 | 1000.0 |

VLV Cellulose Ether Coating Composition Viscosity

| Spindle | 1 Dial Setting | Viscosity (cP) |
|---|---|---|
| 3 | 50 | 408 |
| 3 | 100 | 376 |

VLV Cellulose Ether Coating Composition Trial Parameters

| | |
|---|---|
| Pan Size | 8.0 L |
| Pan Speed | 20 rpm |
| Exhaust Temperature Setpoint | 35° C. |
| Inlet Airflow Rate | 45 cfm |
| Peristaltic Pump Rate | 8 rpm |
| Spray Rate | 3.74 g/min |
| Nozzle Atomization Pressure | 25 psi |

VLV Cellulose Ether Coating Composition Results

| | |
|---|---|
| Coating Time | 272.7 min |

Tablet Weight Gain

| | |
|---|---|
| Target | 4% |
| Actual | 3.35% |

Tablet Batch Weight

| | |
|---|---|
| Start | 6000 g |
| Finish | 6201 g |
| Tablet Appearance | Uniform coating, aesthetically acceptable with glossy appearance. Observed spray drying in exhaust pan. |

Example 3

Low-hydroxypropyl cellulose Ether Coating Composition

| Component | Color, APHA | 2% Viscosity, cP | Amount (% wt) |
|---|---|---|---|
| Component A | | | 10-30 |
| Low-hydroxypropyl cellulose ether 2.61VLV | 15 | 2.61 | |
| Low-hydroxylpropyl cellulose ether 2.66VLV | 16.5 | 2.66 | |
| Component B: polyethylene glycol (MW = 400, CARBOWAX ™ SENTRY ™ 400, CAS No. 25322-68-3, The Dow Chemical Company). | | | 1-10 |
| Component C*: aluminum lake pigment (FD&C Yellow No. 5 HT Al Lake, product no. 5175, Colorcon, Inc.). | | | 0.05-7 |
| Component D*: dye (FD&C Yellow No. 5, product no. FD150, Spectrum Chemical). | | | 0.05-7 |
| Component E: water. | | | qs |

*Component C or Component D is used, not necessarily both simultaneously

Optional Additional Components
Component F: METHOCEL F4PLV.
Component G: METHOCEL F50P.
Component H: METHOCEL E6PLV, METHOCEL.
Component I: sodium lauryl sulfate (MW = 288.38, CAS No. 151-21-3, Sigma-Aldrich).
Component J: SENTRY ™ POLYOX ™ WSR N-10 (CAS No. 25322-68-3, The Dow Chemical Company).
Component K: lactose (CAS No. 5989-81-1).
Component L: acacia (CAS No. 9000-01-5).
Component M: polysorbate 80.
Component N: lubricant, carnauba wax (CAS No. 8015-86-9) or beeswax (CAS No. 8012-89-3).
Component O: pigment, titanium dioxde (CAS No. 13463-67-7).
Component P: polishing agent, carnauba wax (CAS No. 8015-86-9) or beeswax (CAS No. 8012-89-3).
Component Q: anti-tack agent glidant talc (CAS No. 14807-96-6), colloidal silicon dioxide (CAS No. 7631-86-9), glyceryl monostearate (CAS No. 31566-31-1)
Component R: opacifier, calcium carbonate (CAS No. 471-34-1)

Low-hydroxypropyl cellulose ether F2.61VLV and low-hydroxypropyl cellulose ether F2.66VLV are prepared using a depolymerization process coupled with peroxide treatment to prevent polymer darkening during depolymerization. CARBOWAX™ SENTRY™ 400 (PEG, Dow Chemical) and FMK Yellow No, 5 (Spectrum Chemical, FDA lot no. AN3831) are used in conjunction with F2.61VLV and/or F2.66VLV to make low-hydroxypropyl cellulose ether coating compositions. The materials, along with their corresponding functions, are listed in the table below.

| Ingredient | Function |
| --- | --- |
| Low-hydroxypropyl Cellulose Ether | Film-Former |
| PEG 400 | Plasticizer |
| FD&C Yellow No. 5 | Soluble Dye |

Film Coating Liquid Preparation

All coating components are completely dissolved in the aqueous vehicle. Stock solutions are prepared as outlined below.

Preparation of Hypromellose Stock Solutions

To make each low-hydroxypropyl cellulose ether stock solution, water is brought to a boil in a Sunbeam kettle (model no. K47AMD YE) containing an internal heating coil. After bringing the water to a rolling boil, the power supply to the kettle is removed, and the hot water is weighed into a beaker (beaker tare weight recorded). The water is stirred using a StedFast™ Stirrer (model no. SL 600, Fisher Scientific) equipped with a marine propeller-type stirring shaft. Low-hydroxypropyl cellulose ether is slowly added to the stirring hot water until all of the powder is thoroughly dispersed. The dispersion is then allowed to equilibrate to room temperature under constant stirring. Upon reaching room temperature, the low-hydroxypropyl cellulose ether has fully dissolved. The amount of water that evaporates is determined since the weights of the beaker and ingredients are known. The water that evaporates is replaced and mixed into the stock solution. The stock solution is then transferred to a jar, capped, and placed on a roller apparatus overnight. The stock solution is stored at 15° C. until used. Prior to use, the stock solution is equilibrated to room temperature. A low-hydroxypropyl cellulose ether stock solution concentration of 30% (w/w) is prepared.

Preparation of Dye Stock Solution.

To make the FD&C Yellow No, 5 dye stock solution, water is weighed into a beaker of volume capacity at least twice that occupied by the final stock solution. This is done to allow room for vigorous mixing during homogenization. The dye is weighed and added to the water to obtain a 5% (w/w) concentration. The dispersion is then homogenized by a rotor-stator homogenizer (Polyscience, model no. X-520) using the procedure listed in the table below. The procedure is repeated 2-3 times to ensure sufficient dye dispersion and particle size reduction for dissolution.

| Step | Duration (seconds) |
| --- | --- |
| Homogenize at 11,000 rpm* | 15 |
| Homogenize at 15,000 rpm* | 15 |
| Homogenize at 19,000 rpm* | 15 |
| Homogenize at 22,000 rpm* | 15 |
| Homogenize at 26,000 rpm* | 15 |
| Stop homogenizer, and use pipette to rinse sides of beaker with dispersion | 60 |

*rpm = revolutions per minute

Preparation of Film Coating Formulations

The stock solutions are blended together to achieve the desired solid concentration of each ingredient in the resulting film coating formulation. For example, the low-hydroxypropyl cellulose ether stock solution is weighed into a tared jar. Next, polyethylene glycol (PEG) (in its pure form) is added. Then, the FD&C Yellow No. 5 stock solution is added. Finally, a sufficient quantity of water is added to the targeted concentration. The film coating formulation is allowed to mix for at least 30 minutes using a StedFast Stirrer (model no. SL 600, Fisher Scientific) equipped with a marine propeller-type stirring shaft.

Viscosity Measurement

The viscosity of the film coating formulation is measured using a Brookfield Digital Viscometer (model no. DV-11, Brookfield Engineering Laboratories, Inc) equipped with an RV spindle set. Spindles 1 through 7 are used as necessary throughout the studies depending upon the viscosity of the film coating formulation. The spindle rotation settings used are dial readings of 0.5, 1, 2, 5, 5, 10, 20, 50 and 100, with 0.5 being the slowest rotation speed and 100 the fastest. To prepare the instrument, the largest spindle necessary is estimated (depending upon visual observation of the sample viscosity) and attached to the viscometer. The viscometer is then calibrated for that particular spindle. The digital display is programmed to provide the viscosity data in cP units. The dial is set to 0.5, and the spindle motor is turned on. The dial setting is gradually increased until the low indicator light is turned off, indicating that the spindle speed is sufficient to obtain a valid viscosity reading. Viscosity is recorded. Spindle setting is increased, and viscosity readings are recorded until the digital display read "EEE". This indicates that the spindle speed has become too rapid to obtain a valid viscosity reading. The motor to the viscometer is turned off prior to removal of the spindle. Each time a different spindle is used, the viscometer is calibrated for that particular spindle and the display programmed to provide the viscosity data in cP units. If possible, one to three spindles are used to test viscosity.

Film Coating Application

Scored, oval placebo tablets (400 mg per tablet) are compressed using 0.49"×0.27" concaved tooling. The tablet formulation is listed in the table below.

| | Placebo Tablets |
| --- | --- |
| 85% | Pharmatose ® DCL11, Spray Dried (lactose) - DMV International Lot No. 10242933 |
| 14.5% | Avicel ® PH-102 (microcrystalline cellulose) - FMC BioPolymer Lot No. P205815128 |
| 0.5% | Magnesium Stearate - Mallinckrodt Lot No. C09465 |

Tablets are coated with the film coating formulations using a HI-COATER (model LDCS, Vector Corporation) equipped with a 1.3-L baffled pan. The spray nozzles are cleaned and calibrated using the "F3: Calibrate Guns" menu. The film coating trial parameters are programmed using the "F1: Manual Process" menu.

Prior to film coating, the tablets are de-dusted by placing them on a sieve and spraying compressed air through the tablet bed, Next, a 600-g batch of tablets is weighed and introduced into the pan, and the exhaust blower and process heat are initiated. The tablets are allowed to equilibrate to the desired temperature for up to 30 min prior to initiating the coating trial. Exhaust temperature is used as the operating temperature set point, meaning that the heat is automatically adjusted to maintain the exhaust air at a relatively constant temperature. Once the desired exhaust temperature is attained, the pan is operated in continuous fashion, and the film coating formulation is atomized onto the tumbling tablet bed via the nozzle. After the desired amount of film coating formulation has been introduced onto the tumbling tablet bed, atomization is stopped, and the film-coated tablets are tumbled continuously for 30 minutes to dry. After drying, the pan, process heat and exhaust blower are stopped in that order.

The tablets are weighed before and after film coating to determine the percent weight gain. The film-coated tablets are visually inspected for bridging, coating of sharp curvatures, edging, and coat smoothness and homogeneity.

Results

Low-hydroxypropyl Cellulose Ether Coating Composition

The low-hydroxypropyl cellulose ether coating composition along with the parameters used to coat tablets are listed in the tables below. The composition contains a total of 23.94% solids, low-hydroxypropyl cellulose ether 2.66VLV comprised 21% of the 23.94% total solids. The fact that a 21% concentration of the low-hydroxypropyl cellulose ether coating composition is achieved is surprising because the viscosity remained sufficiently low to allow for atomization and tablet coating. Typically, METHOCEL concentrations for film coating do not exceed 10%, so the greater than 2-fold increase in cellulose ether concentration with the low-hydroxypropyl cellulose ether coating composition is significant. The desired amount of coating is applied within 28.4 min, and the weight gain is 3.56% (4% target). The coated tablets are of excellent quality. The applied coating is smooth and uniform.

| Low-hydroxypropyl Cellulose Ether Coating Composition | | |
| --- | --- | --- |
| Ingredient | Solids % (w/w) | Target Qty. (g) |
| Low-hydroxypropyl cellulose ether "F2.66VLV" | 21.00 | 105.00 (30% stock sol.) |
| PEG 400 | 2.14 | 3.21 |
| FD&C Yellow No. 5 | 0.8 | 3.45 (10% stock sol.) |
| Water | — | 38.34 |
| Total | 23.94 | 150.00 |

| Low-hydroxypropyl Cellulose Ether Coating Composition Viscosity (Brookfield Viscosity) | | |
| --- | --- | --- |
| Spindle | Dial Setting | Viscosity (cP) |
| 3 | 50 | $1.07 \times 10^3$ |
| 3 | 100 | EEE |

| Low-hydroxypropyl Cellulose Ether Coating Composition Trial Parameters | |
| --- | --- |
| Pan Size | 1.3 L |
| Exhaust Temperature Set point | 35° C. |
| Inlet Airflow Rate | 45 cfm |
| Pan Speed | 20 rpm |
| Peristaltic Pump Rate | 8 rpm |
| Avg. Spray Rate | 3.58 g/min |
| Nozzle Atomization Pressure | 35 psi |

| Low-hydroxypropyl Cellulose Ether Coating Composition Results | |
| --- | --- |
| Coating Time | 28.4 min |
| Tablet Weight Gain | |
| Target | 4.00% |
| Actual | 3.56% |
| Tablet Batch Weight | |
| Start | 600.01 g |
| Finish | 621.40 g |
| Tablet Appearance | No visible edging on tablets. Tablets are smooth to touch, no speckling with slight shine. Overall aesthetically acceptable looking tablets. Can see small skin on nozzle. |

For purposes of United States patent practice, the contents of any patent, patent application or publication referenced herein are hereby incorporated by reference in their entirety herein, especially with respect to the disclosure of structures, synthetic techniques and general knowledge in the art. It should be understood that various changes and modifications to the presently preferred embodiments described herein will be apparent to those skilled in the art. Such changes and modifications can be made without departing from the spirit and scope of the present disclosure and without diminishing its intended advantages. It is therefore intended that such changes and modifications be covered by the appended claims.

What is claimed is:

1. A composition comprising:
   an aqueous solution of a low-hydroxypropyl cellulose ether present in an amount of at least 10% by weight of the composition, the low-hydroxypropyl cellulose ether being a hydroxypropylmethylcellulose having 27-30% by weight methoxyl groups and 4.0-7.5% by weight hydroxypropoxyl groups, wherein the low-hydroxypropyl cellulose ether is a very low color cellulose ether having a viscosity from 1.2 cP to less than 3 cP when measured as a 2% by weight aqueous solution at 20° C.; and
   a plasticizer selected from the group consisting of polyethylene glycol, castor oil, dibutyl sebacate, diethyl phthalate, glycerol, polyethylene glycol methyl ether, triacetin, triethyl citrate, phospholipids, lecithin, propylene glycol and combinations thereof in an amount of from 1 to 10% by weight of the composition, wherein the composition has a total solids content from 20% by weight to about 40% by weight.

2. The composition of claim 1 wherein the plasticizer is present in an amount of from 1% to 5% by weight of the composition.

3. The composition of claim 2 wherein the plasticizer is a polyethylene glycol having a molecular weight from about 100 to about 1000.

4. The composition of claim 1 wherein the plasticizer is a polyethylene glycol having a molecular weight from about 100 to about 1000.

5. The composition of claim 1 wherein the viscosity of the composition is from 100 cP to 1000 cP at 20° C.

6. The composition of claim 1 comprising a coloring agent.

7. The composition of claim 1 comprising a second cellulose ether.

8. The composition of claim 1 having a total solids content from 23% to 35% by weight of the composition.

9. The composition of claim 1 wherein the low-hydroxypropyl cellulose ether makes up 14 to 23% of the composition by weight.

10. The composition of claim 9 wherein the low-hydroxypropyl cellulose ether makes up 16 to 21% of the composition by weight.

11. The composition of claim 9 wherein the low-hydroxypropyl cellulose ether has a viscosity of no more than 2.66 cP when measured as a 2% by weight aqueous solution at 20° C.

12. A coated composition comprising:
    a substrate selected from the group consisting of tablets for oral ingestion, food products, pharmaceutical capsules, medicaments, drugs, seeds, animal feed, granules, beads, powder, encapsulates, troches and fertilizers; and a coating on the substrate, the coating comprising an aqueous solution of a low-hydroxypropyl cellulose ether present in an amount of at least 10% by weight of the coating, the low-hydroxypropyl cellulose ether being a hydroxypropylmethylcellulose having 27-30% by weight methoxyl groups and 4.0-7.5% by weight hydroxypropoxyl groups, wherein the low-hydroxypropyl cellulose ether is a very low color cellulose ether having a viscosity from 1.2 cP to less than 3 cP when measured as a 2% by weight aqueous solution at 20° C. wherein the coating has a total solids content from 20% by weight to about 40% by weight.

13. The coated composition of claim 12 wherein the substrate comprises a surface and an edge, and the coating covers the surface and the edge.

14. The coated composition of claim 13 comprising a uniform coating on the surface and the edge.

15. The coated composition of claim 12 wherein the coating is a single layer.

16. The coated composition of claim 12 wherein the coating on the substrate additionally comprises a plasticizer.

17. The coated composition of claim 16 wherein the plasticizer is selected from the group consisting of polyethylene glycol, castor oil, dibutyl sebacate, diethyl phthalate, glycerol, polyethylene glycol methyl ether, triacetin, triethyl citrate, phospholipids, lecithin, propylene glycol and combinations thereof.

18. The coated composition of claim 12 wherein the composition comprises an aqueous solution of a low-hydroxypropryl cellulose ether in an amount of 14 to 23% by weight of the coating.

* * * * *